(12) United States Patent
Pankow

(10) Patent No.: US 7,878,406 B2
(45) Date of Patent: Feb. 1, 2011

(54) OPTICAL READER

(75) Inventor: Matthew W. Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 34 days.

(21) Appl. No.: 11/650,018

(22) Filed: Jan. 5, 2007

(65) Prior Publication Data

US 2008/0164315 A1 Jul. 10, 2008

(51) Int. Cl.
*G02B 26/08* (2006.01)
*G06K 7/10* (2006.01)

(52) U.S. Cl. ............. 235/462.22; 235/454; 235/462.01; 235/462.08; 235/462.09; 235/462.1; 235/462.11; 235/462.14; 235/462.2; 235/462.24; 235/462.41; 235/462.42; 235/472.01; 235/472.02; 235/472.03

(58) Field of Classification Search ................. 235/454, 235/462.01–462.45, 472.01–472.03
See application file for complete search history.

(56) References Cited

U.S. PATENT DOCUMENTS 5,701,001 A * 12/1997 Sugifune et al. ....... 235/462.42
6,234,394 B1 * 5/2001 Kahn et al. ............. 235/462.46
6,340,114 B1 * 1/2002 Correa et al. ........... 235/462.22
6,808,114 B1 * 10/2004 Palestini et al. .............. 235/454
6,832,725 B2 * 12/2004 Gardiner et al. ......... 235/462.21
7,140,546 B1 * 11/2006 Terlizzi et al. .......... 235/472.01
7,395,971 B2 * 7/2008 Knowles et al. ......... 235/462.32
2001/0038037 A1 * 11/2001 Bridgelall et al. ....... 235/462.14
2006/0118627 A1 * 6/2006 Joseph et al. ................ 235/454
2007/0131770 A1 * 6/2007 Nunnink ...................... 235/454
2007/0170259 A1 * 7/2007 Nunnink et al. ......... 235/462.21

* cited by examiner

*Primary Examiner*—Thien M. Le
*Assistant Examiner*—Tuyen K Vo
(74) *Attorney, Agent, or Firm*—Hiscock & Barclay, LLP

(57) ABSTRACT

An optical reader comprises: a first illumination source for projecting a first illumination field on a target; a second illumination source for projecting a second illumination field on a target; an image sensor array for converting light from a target into output signals representative thereof; and, a processor for decoding information from information bearing indicia within the target derived from the output signals; and, wherein the illuminance of the first illumination field on the target at a distance D from the first illumination source is greater than the illuminance of the second illumination field on the target at the distance D from the second illumination source.

10 Claims, 7 Drawing Sheets

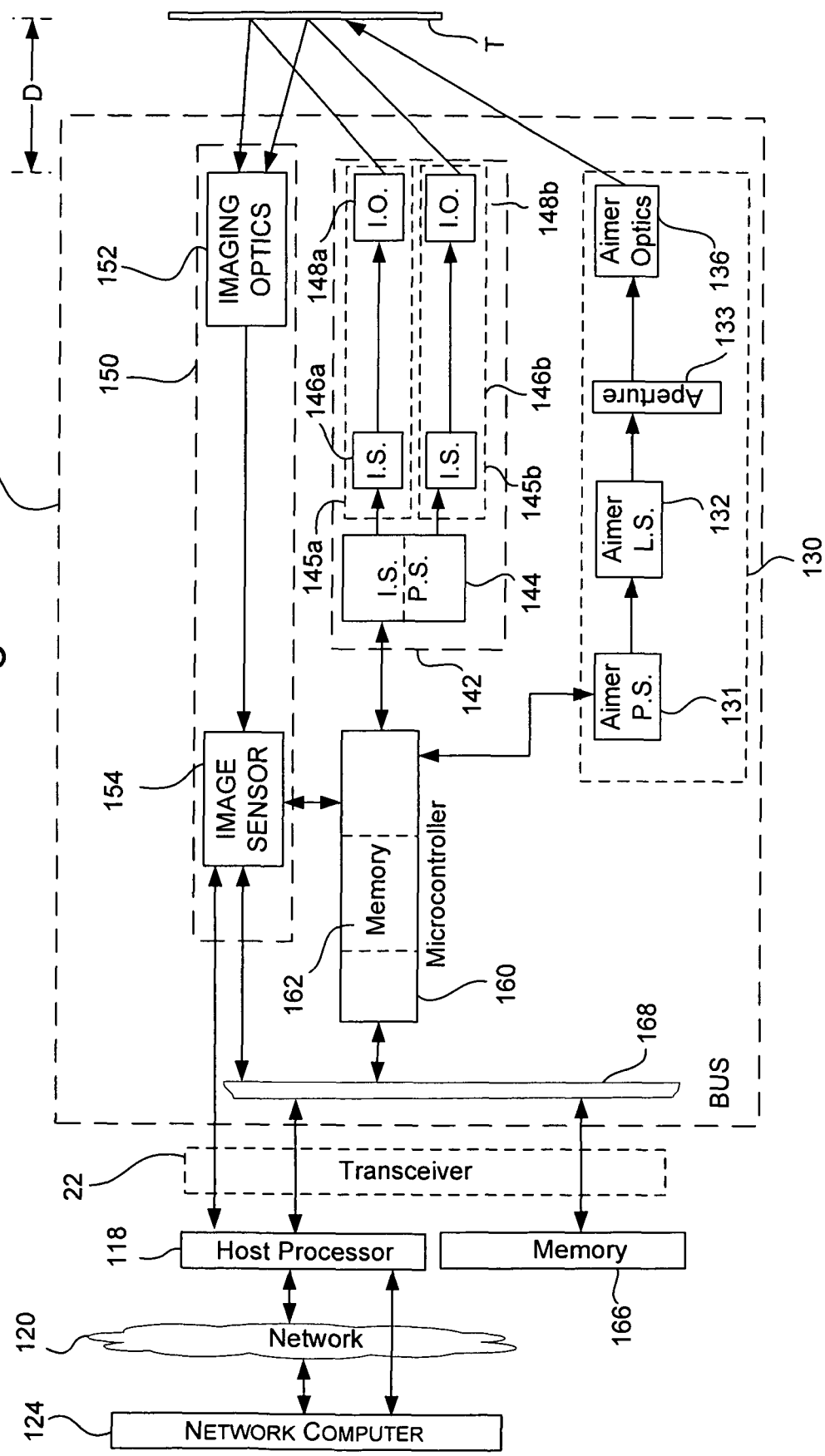

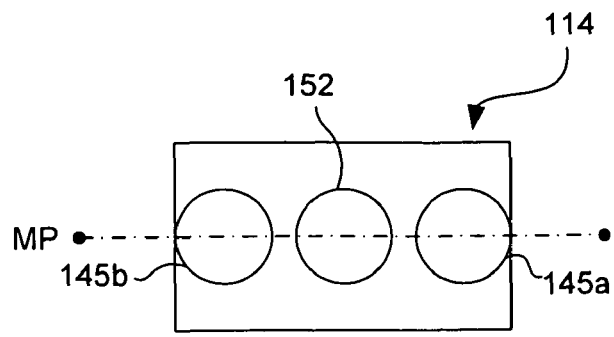
Fig. 3a
Fig. 3b
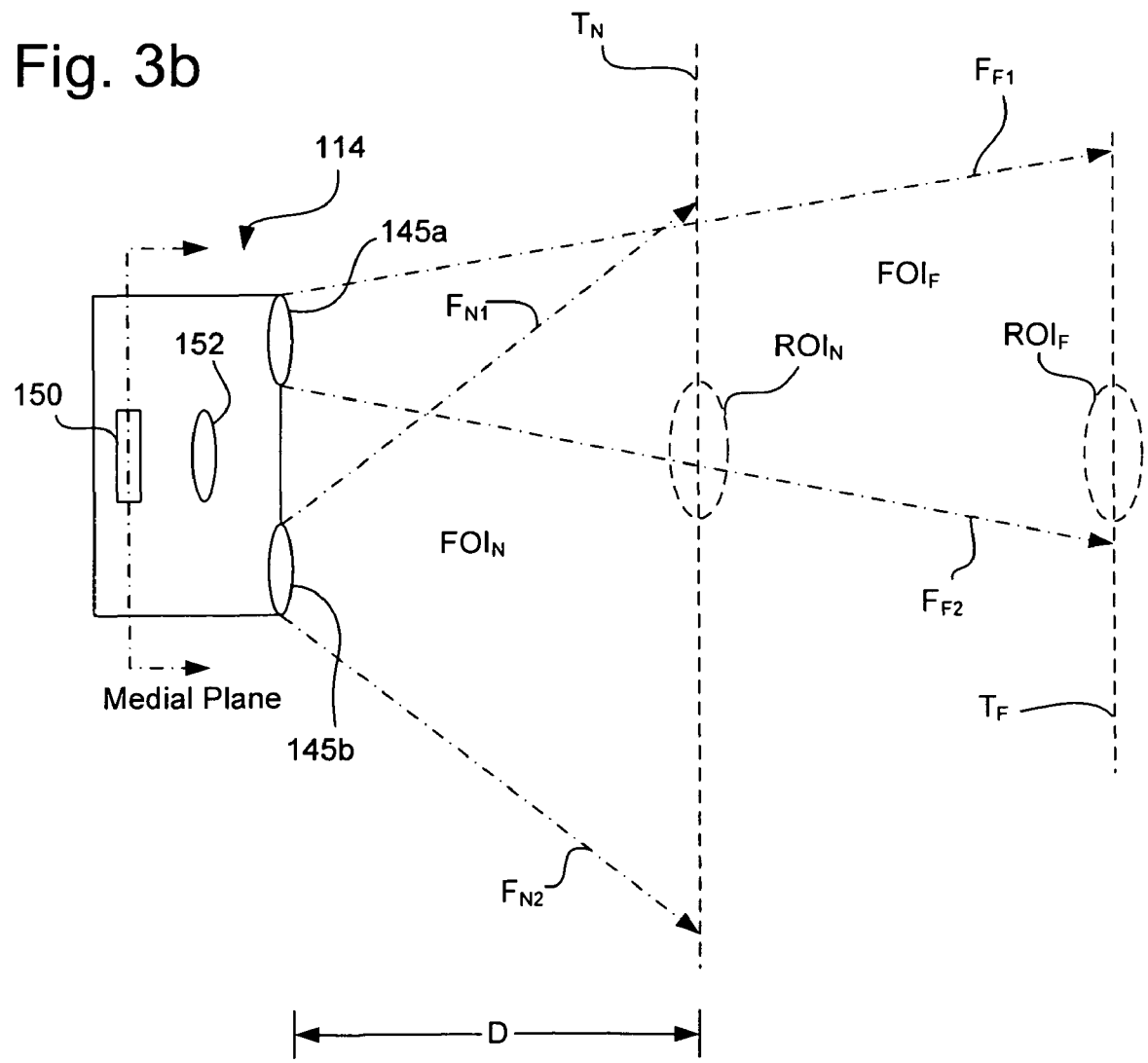

OPTICAL READER

FIELD OF THE INVENTION

The present invention relates to optical reading devices, and more particularly to an optical reading device that provides near field and far field illumination.

BACKGROUND

Optical reading devices typically read data represented by symbols. For instance one type of a bar code symbol is an array of rectangular bars and spaces that are arranged in a specific way to represent elements of data in machine readable form. Optical reading devices typically transmit light onto a symbol and receive light scattered and/or reflected off of a bar code symbol. The received light is interpreted to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively high resolution in one dimension only, but multiple linear scans are needed to read the whole symbol.

A class of bar code symbologies known as two dimensional (2D) matrix symbologies have been developed which offer greater data densities and capacities than 1 D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

SUMMARY OF THE INVENTION

The invention comprises, in one form thereof, an optical information bearing indicia reader on a comprising a first illumination source for projecting a first illumination field on the target, a second illumination source for projecting a second illumination field on the target an image sensor array for converting light from a target into output signals representative thereof, and a processor for decoding information from information bearing indicia within the target derived from the output signals wherein illuminance of the first illumination field on the information bearing indicia at a distance D from the first illumination source is greater than illuminance of the second illumination field on the information bearing indicia at the distance D from the second illumination source.

BRIEF DESCRIPTION OF THE DRAWINGS

FIG. 2a is a block schematic diagram of an exemplary optical reader in accordance with the invention.

FIG. 3a is a schematic block diagram of a front view of an exemplary optical reader system in accordance with the present invention.

FIG. 3b is a schematic block diagram of a top view of an exemplary optical reader system illustrating the illumination patterns directed at near and far targets in accordance with the present invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" used herein refers to reading or extracting data from an information bearing indicia or symbol.

An exemplary optical reader system in accordance with the invention may be adapted for reading symbol indicia for numerous functions. A detailed description of transaction terminals and their operation is disclosed in commonly owned published U.S. patent application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
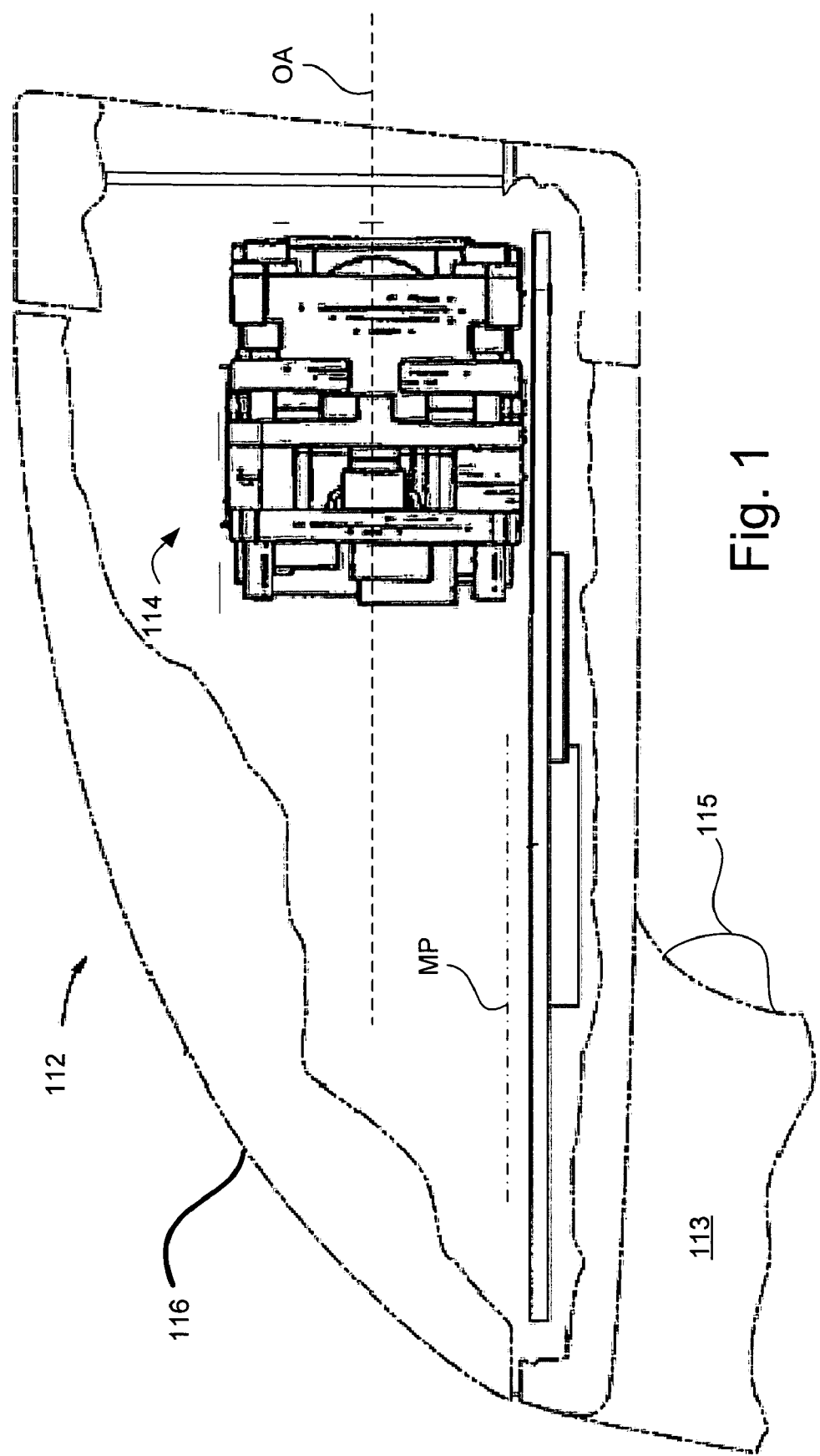
FIG. 1 is a fragmentary partially cutaway side view of an exemplary reader in accordance with the invention.

Referring to FIG. 1, an exemplary optical or indicia reader 112 which may have a number of subsystems for capturing and reading images, some of which may have symbol indicia provided therein. Reader 112 may have an imaging reader assembly 114 provided within a head portion or housing 116 which may be configured to be hand held by a handle portion 113. A trigger 115 may be used to control operation of the reader 112. The head portion 116 may have a medial plane MP selected so that when the hand-held imager is held with the head portion generally in a horizontal plane, the medial plane MP will generally be perpendicular to the face of the scanning head 116. Generally operators have a tendency to hold the medial plane of the head portion of the imager approximately normal to the plane of the target when collecting data. Image reader assembly 114 has imaging reader imaging optics having an optical axis (OA) for receiving light reflected off of a target T. The optical axis is a line of symmetry through the imaging optics. The target may be any object or substrate which may bear a 1 D or 2D bar code symbol or text or other machine readable indicia. A trigger 115 may be used for controlling full or partial operation of the reader 112.

Figure 2B:
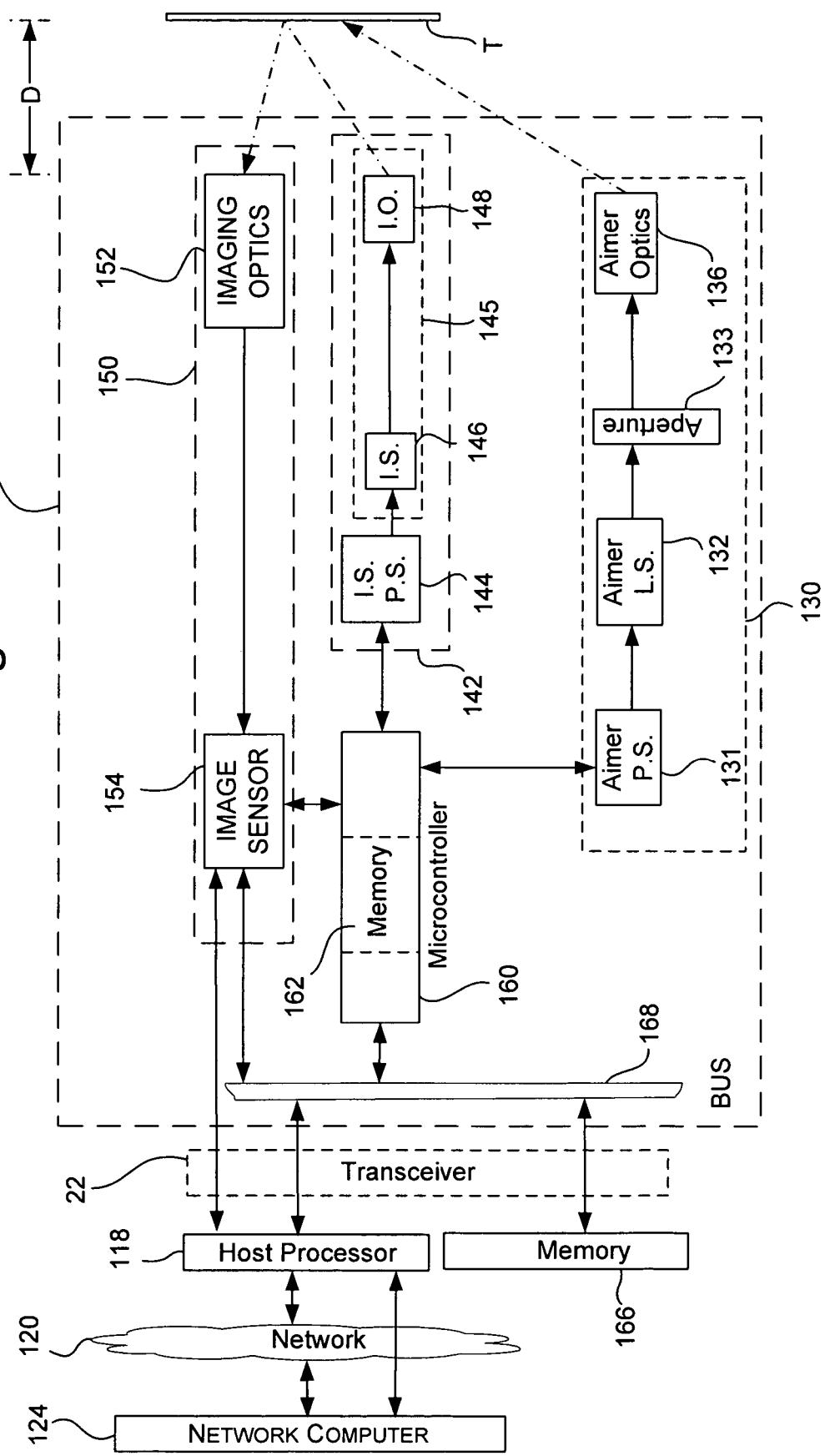
FIG. 2b is a block schematic diagram of an exemplary optical reader in accordance with the invention.

Referring to FIGS. 2a and 2b, exemplary imaging systems may include a reader 112 in communication with a host processor 118. Communication with the host device may be via a transceiver 22 located in the indicia reader 112. This host processor may be in communication with a network 120 which may be connected to one or more network computers 124. Imaging reader assembly 114 may include a number of components, such as an aiming pattern generator 130, an illumination generator 142, an imaging system 150, a microcontroller 160 and a bus 168.

Aiming pattern generator 130 may include a power supply 131, light source 132, aperture 133 and optics 136 to create an aiming light pattern projected on or near the target which spans a portion of the imaging system 150 operational field of view with the intent of assisting the operator to properly aim the scanner at the information bearing indicia that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source(s) 132 may comprise any light source to provide a desired illumination pattern at the target and may be one or more LEDs 134, such as part number NSPG300A made by Nichia Corporation. Aiming light sources with different colors may be employed.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis.

Alternately, the aimer pattern generator may be a laser pattern generator.

The light sources 132 may also be comprised of one or more laser diodes such as those available from Rohm. In this case a laser collimation lens (not shown) will focus the laser light to a spot generally forward of the reader and approximately at the plane of the target T. This beam may then be imaged through a diffractive interference pattern generating element, such as a holographic element fabricated with a desired pattern. Examples of these types of elements may be available for example, from Digital Optics Corp. of Charlotte, N.C. among others. Elements of these types are described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Imaging system 150 may include an image sensor 154, and imaging optics 152.

Image sensor 154 may be a two dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc.

Further description of image sensors is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Image sensor 154 may be a two dimensional array of pixels adapted to operate in a rolling shutter mode capable of sequentially exposing and reading-out lines of pixels in the image sensor array. A rolling shutter architecture may have overlapping exposure periods and may require that the illumination source remain on during substantially all of the time required to capture a frame of data so that illumination is provided for all of the rows. In this manner the optical reader reads symbol indicia and produces digital symbol image data representative of the symbol indicia, the digital symbol image data being comprised of pixels systematized into rows wherein each pixel has a digital value. The timing of exposure period and illumination period may cause at least a portion of the exposure period to occur during the illumination period. The time during which the pixels are collectively activated to photo-convert incident light into charge defines the exposure period for the sensor array. At the end of the exposure period, the collected charge is transferred to a shielded storage area until the data is read out.

The image sensor may be capable of operating in either the rolling shutter mode or a global electronic shutter mode. The circuitry implementing the rolling shutter operation and the circuitry implementing the global electronic shutter operation may be implemented on the same CMOS chip or one or both of the circuitry components can be implemented on separate dedicated chips. In an additional embodiment, the rolling shutter functionality and the global electronic shutter operation can be combined in a single module that includes hardware, software, and/or firmware. Automatically focusing the image reader to image the target may be achieved with one frame of data.

The image sensor 154 may be able to dynamically shift between the global electronic shutter operational mode and the rolling shutter operational mode. For example, the image reader may shift from a default global electronic shutter operational mode to a rolling shutter operational mode when the ambient light exceeds a given threshold. In general, the shutter efficiency of a CMOS image sensor with global electronic shutter capabilities specifies the extent to which the storage area on the image sensor is able to shield stored image data. In one embodiment that addresses image degradation introduced by excessive ambient light, the image sensor shifts to rolling shutter operation when the intensity of the ambient light exceeds a level determined with respect to the light source intensity, the shutter efficiency of the image reader, and the intensity of the ambient light.

The image sensor 154 may be a color image sensor. Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference.

The output of the image sensor may be processed utilizing one or more functions or algorithms to condition the signal appropriately for use in further processing downstream, including being digitized to provide a digitized image of target T.

Microcontroller 160, may perform a number of functions, such as controlling the illumination generator 142 or aiming pattern generator 130. Microcontroller 160 may also control other functions and devices. An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects. Microcontroller 160 may include a predetermined amount of memory 162 for storing data.

The components in reader 112 may be connected by one or more bus 168 or data lines, such as an Inter-IC bus such as an $I^2C$ bus, which is a control bus that provides a communications link between integrated circuits in a system. This bus may connect to a host computer in relatively close proximity, on or off the same printed circuit board as used by the imaging device. $I^2C$ is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 may involve the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160. One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code.

Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Operation of the decoding, which may be executed in a user or factory selectable relationship to a scanning routine, may be governed by parameters which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 112. In the continuous mode, the reader takes continuous image exposures seriatim and continuously decodes or attempts to decode some or all of these images. In the continuous mode exposure times and decoding times may be limited. In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed.

Discontinuous mode is a mode wherein scanning and/or decoding stops or is interrupted and initiated with an actuation event, such as pulling of a trigger 115, to restart. An exemplary utilization of the reader in discontinuous mode is via hand held operation. While triggered, the image reader may expose images continuously and decode images continuously. Decoding stops once the image reader is no longer triggered. Exposing of images however, may continue. In the discontinuous mode, the exposure time, decoding time out limits and decoding aggressiveness may be increased more than those set for continuous mode. The discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger 115 located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader may limit the type of symbols to decode when in the continuous mode.

Mode changes may also be accomplished by the host computer in response to an appropriate signal over either a direct connection or wireless connection to the scanner.

The aiming pattern generator may be programmed to operate in either the continuous or discontinuous modes of the reader.

Illumination generator 142 projects a light field or pattern on the target which spans at least a portion of the imaging optical system 152 operational field of view with the intent of illuminating the information bearing indicia such that data obtained from the image sensor may be decoded. Illumination generator 142 may include one or more illumination power supplies 144, one or more illumination packages 145a, 145b which may comprise illumination sources 146a, 146b and illumination optics 148a, 148b.

Illumination sources may comprise laser or light emitting diodes (LEDs), wherein LEDs of different colors may be employed. For example, in one embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

FIG. 2b illustrates an illumination generator having one illumination package 145 having one illumination source 146 and one illumination optical element 148.

Referring to FIG. 3a, a front schematic view of an exemplary optical indicia reader in accordance with the present invention illustrates an image reader having illumination packages 145a, 145b. The receive imaging optics 152 is illustrated between the illumination packages.

Referring to FIG. 3b, a schematic top view of an exemplary optical indicia reader in accordance with the present invention illustrates an image reader assembly 114 having an illumination package 145a for providing an illumination field $FOI_F$ on a region of interest $ROI_F$ in the target area $T_F$ illustrated by an overall pattern having borders substantially defined by lines $F_{F1}$, $F_{F2}$. These lines may represent, for instance, the full width half maximum value (FWHM) of the illumination source package on the target. Image reader assembly 114 also has an illumination package 145b for providing an illumination field $FOI_N$ on a region of interest $ROI_N$ in the target area $T_N$ illustrated by an overall pattern having borders substantially defined by lines $F_{N1}$, $F_{N2}$. These lines may represent, for instance, the full width half maximum value (FWHM) of the illumination source package on the target. It is to be noted that the illuminance of the illumination field incident on the region of interest $ROI_N$ at a distance D from illumination source package 145a is greater than the illuminance of the illumination field incident on the region of interest $ROI_N$ at the distance D from illumination source package 146b. Likewise the illuminance of the first illumination field incident on the region of interest $ROI_N$ from illumination source package 145a is greater than the illuminance of the illumination field incident on the region of interest $ROI_N$ at the distance D from illumination source package 146b. The illumination field from illumination source package 145a may be described as more "compressed" than that of illumination source package 146b. In this manner, a brighter spot is realized at that farther distanced $ROI_F$ on Target $T_F$. Advantages of this configuration may be better "readability" of indicia at the greater distance due to such benefits as increased hand motion tolerance.

It is also to be noted that the illumination field $FOI_F$ may be smaller than the field of view (FOV) of the imaging system.

Illuminance is luminous flux received (or incident) per unit area on the surface of the target defined as the luminous intensity on a surface in a specific direction, divided by the projected area as viewed from that direction. Illuminance may be measured in lux (lx) where 1 lux equals 1 lumen per square meter. Luminous flux may be measured in lumens (lm), which may be measured in a far field in which the inverse squared law may be applied. A full width at half maximum (FWHM) may be an expression of the extent of the function, given by the difference between the two extreme values of an independent variable at which an dependent variable is equal to half of its maximum value.

It may be desirable to read indicia positioned far away from the reader. To accomplish this, enough samples for the decoder need to be taken at that distance and enough light has to be projected for hand motion to be acceptable.

Indicia takes up a small percentage of the imager FOV at large distances. If the illumination field is "compressed" a brighter spot at these distances facilitates better hand motion tolerance. This illumination pattern would not be very useful up close when the indicia fills a large portion of the imager FOV. One illumination field may fill the FOV for use when scanning close. Another may be significantly smaller and may be sized to illuminate indicia farther away. Software control of the imager may switch between the illumination sources based on the perceived size of the indicia in the FOV. To this end, an image range finder may be utilized for switching the two illumination sources. One illumination source may be a wide field for up close use and the other may be a narrow field for far away reading.

Different aiming patterns may be projected on or near different far and near targets to assist an operator to aim the scanner at indicia at different distances to be read.

Different types illumination sources may be utilized. For example, one illumination source may be a LED and the other may be a laser.

Figure 4A:
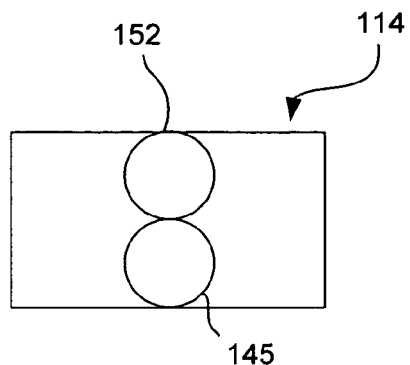
FIG. 4a is a schematic block diagram of a front view of an exemplary optical reader system in accordance with the present invention.
Figure 4B:
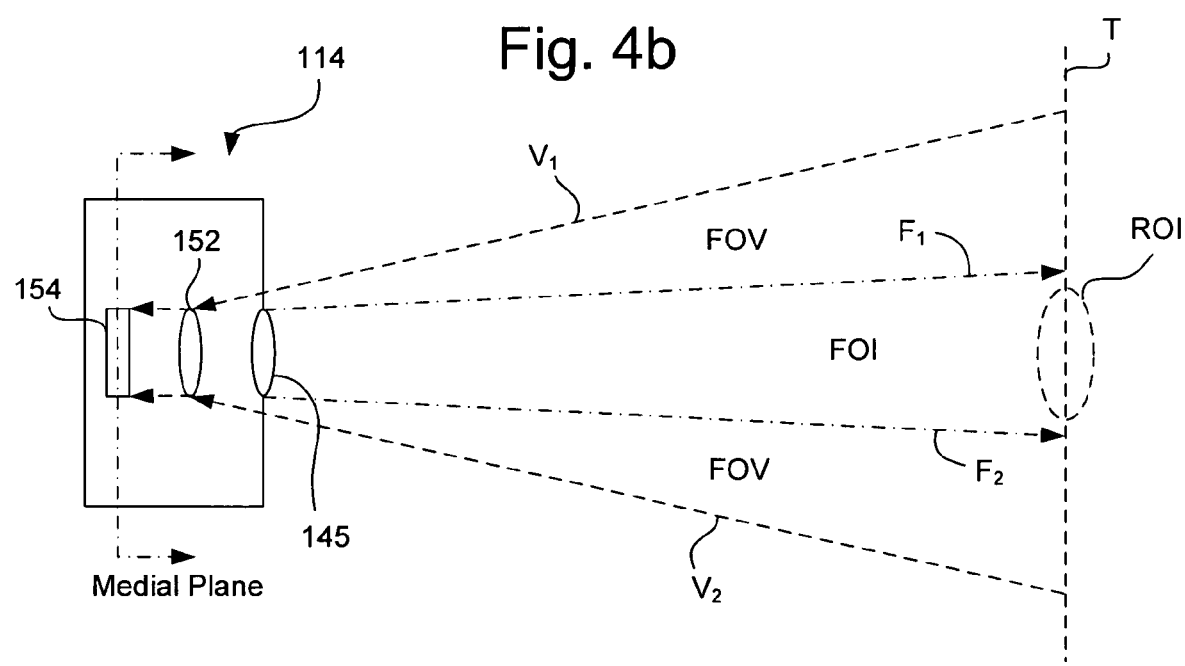
FIG. 4b is a schematic block diagram of a top view of an exemplary optical reader system illustrating the illumination patterns directed at near and far targets in accordance with the present invention.

Referring to FIGS. 4a-b, schematic views of an exemplary optical indicia reader in accordance with the present invention illustrate an image reader assembly 114 having an illumination package 145 for providing an illumination field FOI on a region of interest ROI in the target area T illustrated by an overall pattern having borders substantially defined by lines $F_1$, $F_2$. These lines may represent, for instance, the full width half maximum value (FWHM) of the illumination source package on the target. The illumination field from illumination source package 145 may be described as "compressed" such that the illumination field FOI may be smaller than the field of view (FOV) of the imaging system 150, illustrated by an overall pattern having borders substantially defined by lines $V_1$, $V_2$. In this manner, a brighter spot is realized at the ROI on Target T. The optical axis of the illumination source package 145 may be aligned with the imaging system 150 optical axis. The illumination source package 145 may be located above or below the imaging system 150.

Figure 5A:
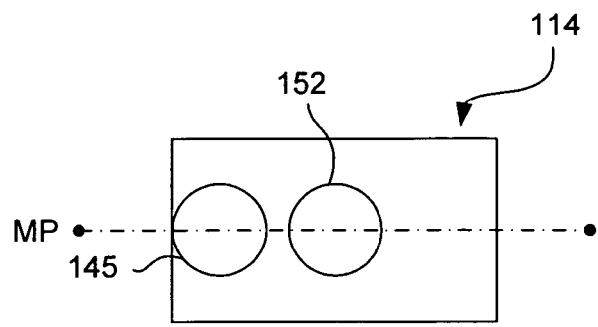
FIG. 5a is a schematic block diagram of a front view of an exemplary optical reader system in accordance with the present invention.
Figure 5B:
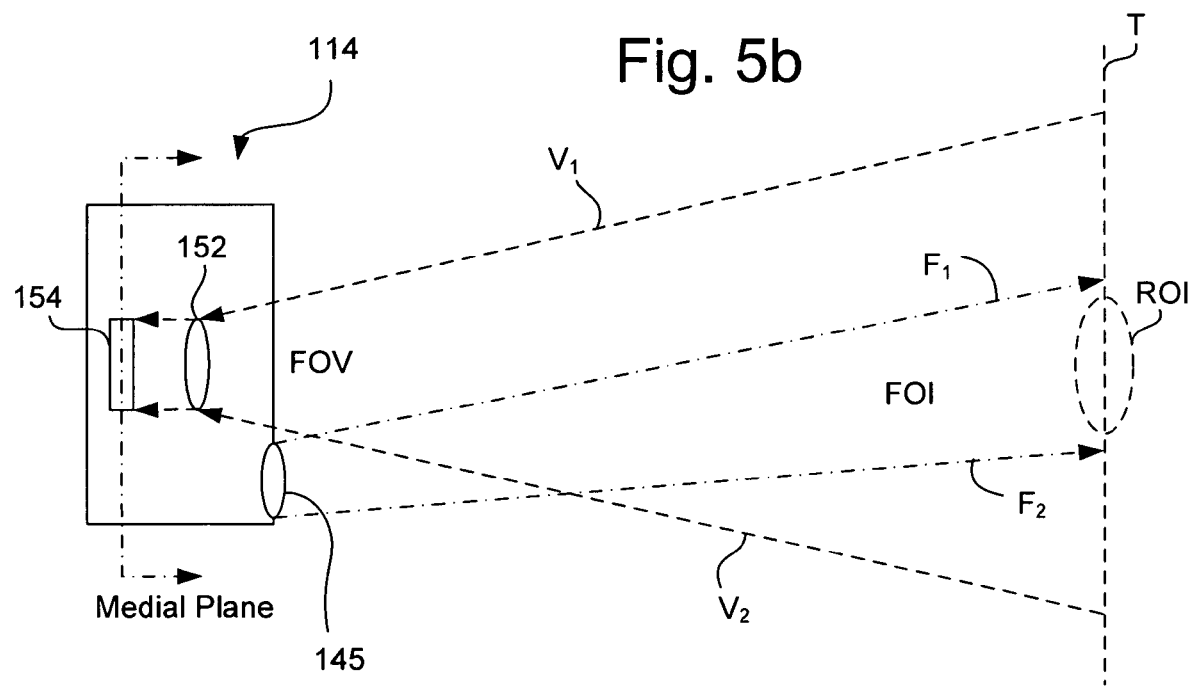
FIG. 5b is a schematic block diagram of a top view of an exemplary optical reader system illustrating the illumination patterns directed at near and far targets in accordance with the present invention.

Referring to FIGS. 5a-b, schematic views of an exemplary optical indicia reader in accordance with the present invention illustrate an image reader assembly 114 having an illumination package 145 for providing an illumination field FOI on a region of interest ROI in the target area T illustrated by an overall pattern having borders substantially defined by lines $F_1$, $F_2$. These lines may represent, for instance, the full width half maximum value (FWHM) of the illumination source package on the target. The illumination field from illumination source package 145 may be described as "compressed" such that the illumination field FOI may be smaller than the field of view (FOV) of the imaging system 150, illustrated by an overall pattern having borders substantially defined by lines $V_1$, $V_2$. In this manner, a brighter spot is realized at the ROI on Target T. The illumination source package 145 may be located on either side of the imaging system 150.

Figure 6:
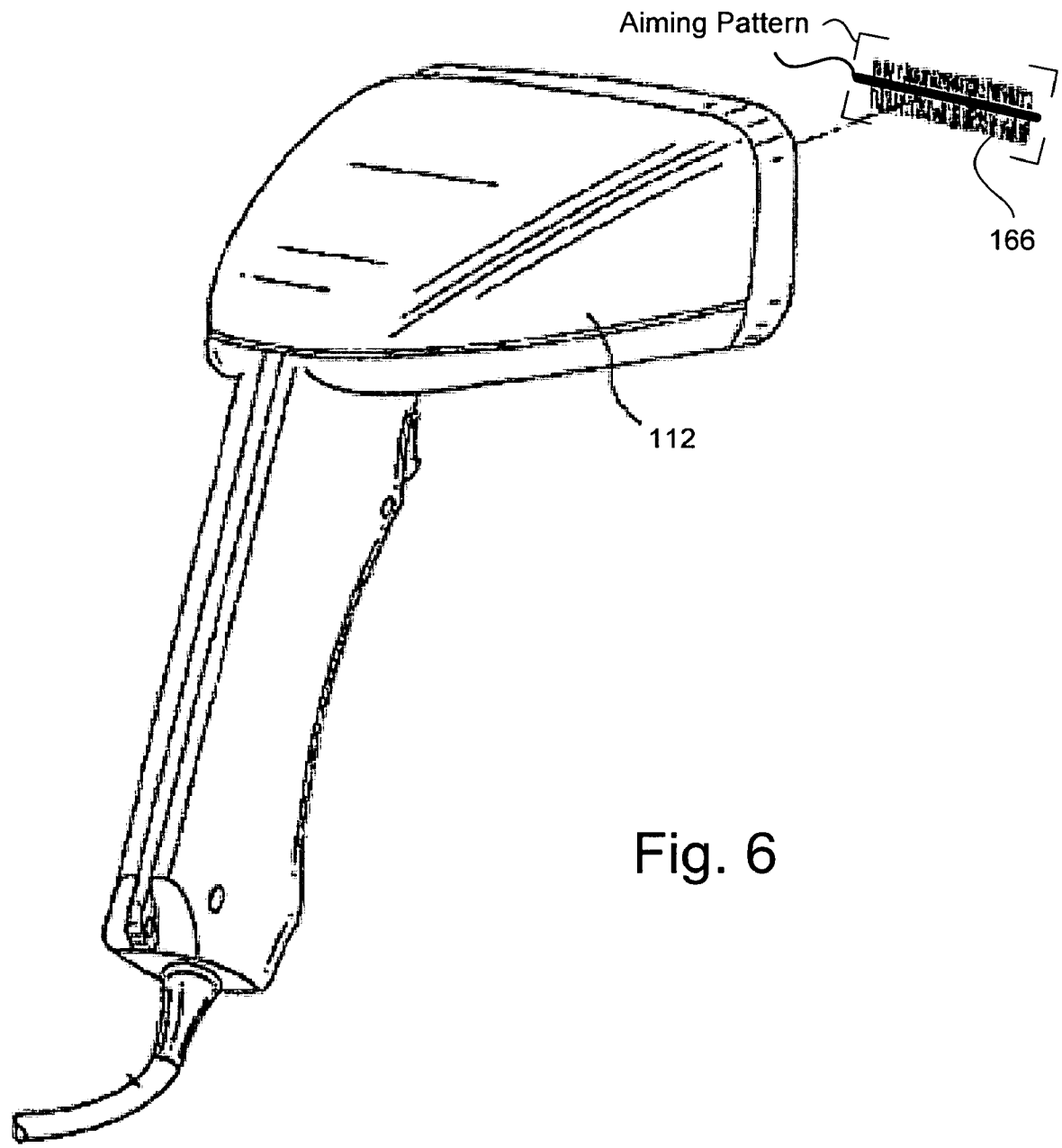
FIG. 6 is a perspective view of an optical reader directing an aiming pattern on a target.

FIG. 6 is an illustration of an exemplary optical reader directing an aiming pattern on a target.

Described herein is an optical reader comprising: a first illumination source for projecting a first illumination field on a target; a second illumination source for projecting a second illumination field on a target; an image sensor array for converting light from a target into output signals representative thereof; and, a processor for decoding information from information bearing indicia within the target derived from the output signals; and, wherein the illuminance of the first illumination field on the indicia at a distance D from the first illumination source is greater than the illuminance of the second illumination field on the target at the distance D from the second illumination source.

Described herein is an optical reader comprising: an illumination source for projecting an illumination field on a target; an image sensor array for converting light from a target into output signals representative thereof, the image sensor array having a field of view (FOV); and, a processor for decoding information from information bearing indicia within the target derived from the output signals; and, wherein the illumination field on the target is smaller than the FOV.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware and/or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

Alternate optical configurations to those drawn are also contemplated. Because many optically equivalent configurations can be created for the simple optical functions described herein, all these alternate embodiments are considered to be within the scope of the inventions described herein.

The invention claimed is:

1. An optical information bearing indicia reader for reading information bearing indicia on a target comprising:
    a first illumination source for projecting a first illumination field on a target;
    a second illumination source for projecting a second illumination field on the target;
    an image sensor array for converting light from the target into output signals representative thereof; and,
    a processor for decoding information from the output signals;
    wherein illuminance of the first illumination field on the information bearing indicia at a distance D from the first illumination source is greater than illuminance of the second illumination field on the information bearing indicia at the distance D from the second illumination source;
    wherein every time an information bearing indicia is read only one of the first and second illumination sources project an illumination field on the target during the time that the indicia is being read based on the distance to the target and wherein the illumination sources are switched based on the perceived size of the information bearing indicia in the target.

2. An optical information bearing indicia reader in accordance with claim 1, wherein the first and second illumination sources are different colors.

3. An optical information bearing indicia reader in accordance with claim 1, further comprising an aiming pattern generator for projecting different aiming patterns on or near different far and near targets.

4. An optical information bearing indicia reader in accordance with claim 1, wherein one illumination source is a LED and the other illumination source is a laser.

5. A method of reading information bearing indicia on a target comprising the steps of:
    illuminating the target with a first illumination source having a first illumination field and a second illumination source having a second illumination field;
    converting light from the target with an image sensor array into output signals representative thereof; and,
    decoding information from the output signals;
    switching between the first and second illumination sources based on the perceived size of the information bearing indicia in the target;
    wherein illuminance of the first illumination field on information bearing indicia at a distance D from the first illumination source is greater than illuminance of the second illumination field on the information bearing indicia at the distance D from the second illumination source;
    wherein every time an information bearing indicia is read only one of the first and second illumination sources project an illumination field on the target during the time that the indicia is being read based on the distance of the target.

6. A method of reading information bearing indicia on a target in accordance with claim 5, further comprising the step of utilizing an image range finder for switching the illumination sources.

7. A method of reading information bearing indicia on a target in accordance with claim 5, further comprising the step of projecting different aiming patterns on or near different far and near targets.

8. A method of reading information bearing indicia on a target comprising the steps of:
    illuminating the target with illumination sources having illumination fields, wherein one illumination field is wider for a close target and another illumination field is narrower for a target further away;
    switching between the first and second illumination sources based on the perceived size of the information bearing indicia in the target;
    converting light from the target with an image sensor array into output signals representative thereof, the image sensor array having a field of view (FOV); and,
    decoding information from the output signals.

9. A method of reading information bearing indicia on a target in accordance with claim 8, further comprising the step of utilizing an image range finder for switching the illumination sources.

10. A method of reading information bearing indicia on a target in accordance with claim 8, further comprising the step of projecting different aiming patterns on or near different far and near targets.

* * * * *